United States Patent
Schmitz et al.

(10) Patent No.: US 6,469,500 B1
(45) Date of Patent: Oct. 22, 2002

(54) METHOD FOR DETERMINING THE POSITION AND/OR SPEED OF MOTION OF A CONTROL ELEMENT THAT CAN BE MOVED BACK AND FORTH BETWEEN TWO SWITCHING POSITIONS

(75) Inventors: Günter Schmitz; Christian Boie, both of Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/700,519

(22) PCT Filed: Mar. 9, 2000

(86) PCT No.: PCT/EP00/02038

§ 371 (c)(1),
(2), (4) Date: Jan. 26, 2001

(87) PCT Pub. No.: WO00/57135

PCT Pub. Date: Sep. 28, 2000

(30) Foreign Application Priority Data

Mar. 23, 1999 (DE) .......................................... 199 13 050

(51) Int. Cl.$^7$ ............................ G01B 7/14; G01P 3/50; H01F 7/08; F01L 9/04; F16K 31/02
(52) U.S. Cl. ............ 324/207.16; 324/163; 324/207.18; 324/207.19; 123/90.11; 251/129.16; 335/258
(58) Field of Search ....................... 324/207.15–207.19, 324/207.22, 207.24, 207.26, 163, 164, 173, 174; 92/5; 137/554; 123/90.11; 251/129.1, 129.15–129.18; 361/170, 187, 188; 225/229, 251, 255, 256, 258

(56) References Cited

U.S. PATENT DOCUMENTS

| 5,045,785 | A | | 9/1991 | Hansen ................... 324/207.16 |
| 5,210,490 | A | * | 5/1993 | Munch et al. .......... 324/207.17 |
| 5,233,293 | A | * | 8/1993 | Huang et al. ........... 324/207.15 |
| 5,804,962 | A | * | 9/1998 | Kather et al. ........... 324/207.16 |
| 6,078,235 | A | * | 6/2000 | Schebitz et al. |

FOREIGN PATENT DOCUMENTS

| DE | 33 03 994 | | 8/1983 | |
| DE | 3347052 | * | 7/1985 | ............ 324/207.16 |
| JP | 10260675 | | 9/1998 | |

\* cited by examiner

*Primary Examiner*—Gerard R. Strecker
(74) *Attorney, Agent, or Firm*—Venable; Norman N. Kunitz

(57) ABSTRACT

The invention relates to a method for determining the position and/or the speed of motion of a control element which can be moved back and forth between a first and second switching position. According to said method, an immersion body which is connected to the control element is guided through at least one stationary plunger coil, synchronously with the motion of said control element. The voltage that is generated as a result of the immersion body moving in relation to a permanent magnet and/or a permanent magnet moving in relation to the plunger coil is detected as a signal for the speed of motion of the control clement. The changes in impedance and or a current that are caused as a result of the movement of the immersion body in the plunger coil are detected as a signal for the position of the control element.

13 Claims, 7 Drawing Sheets

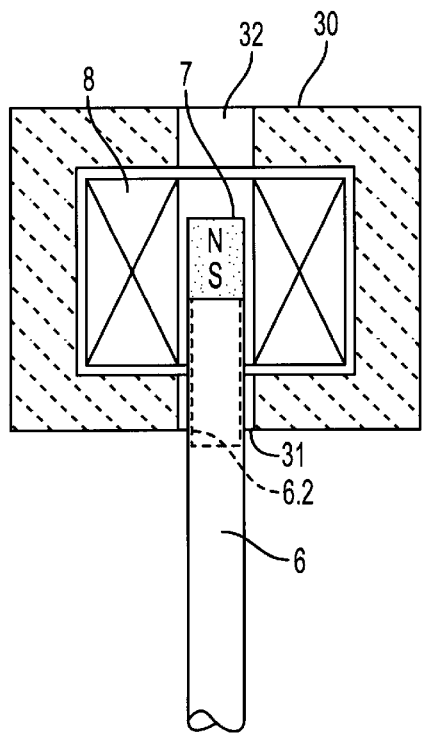
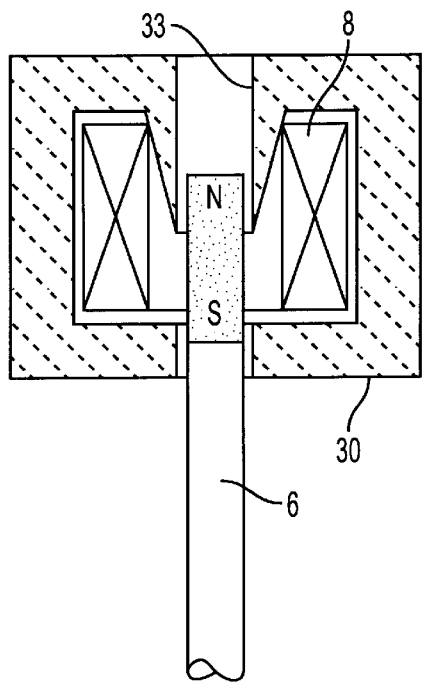
FIG. 6  FIG. 7
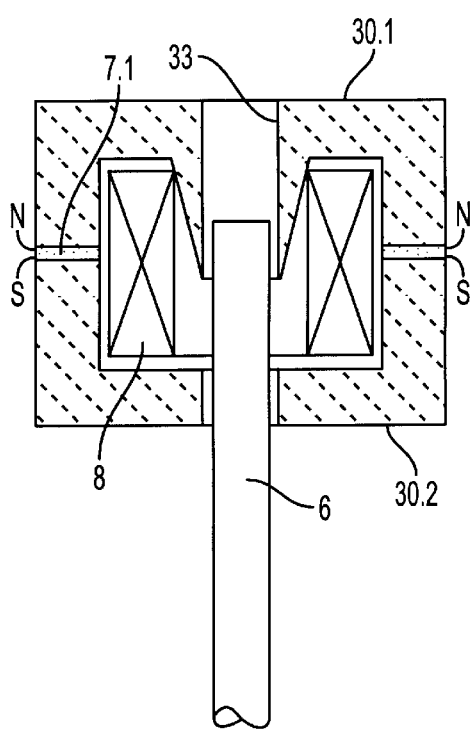
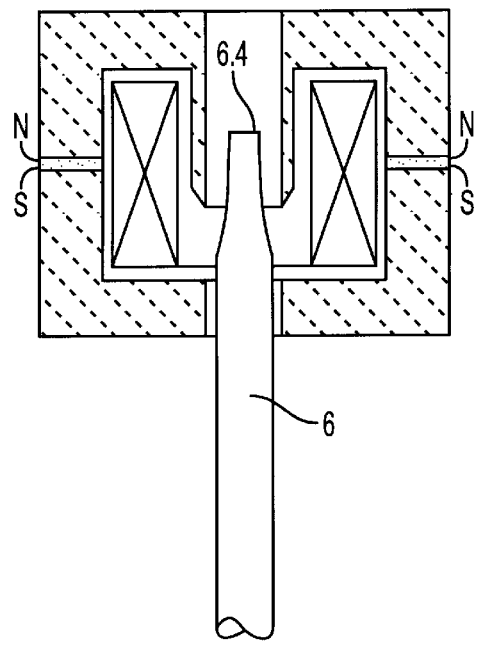
FIG. 8  FIG. 9

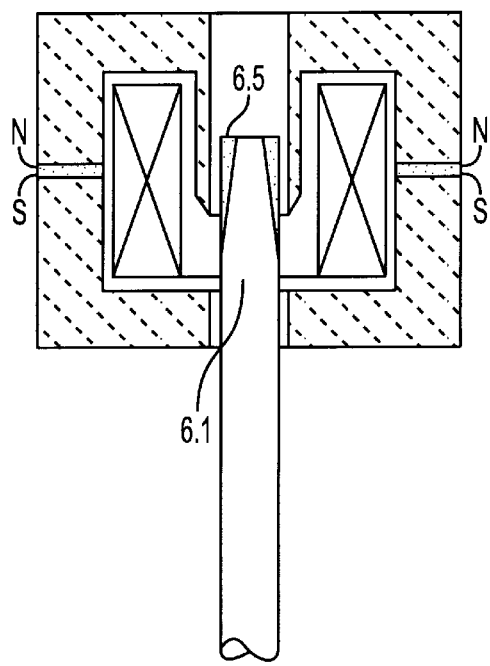
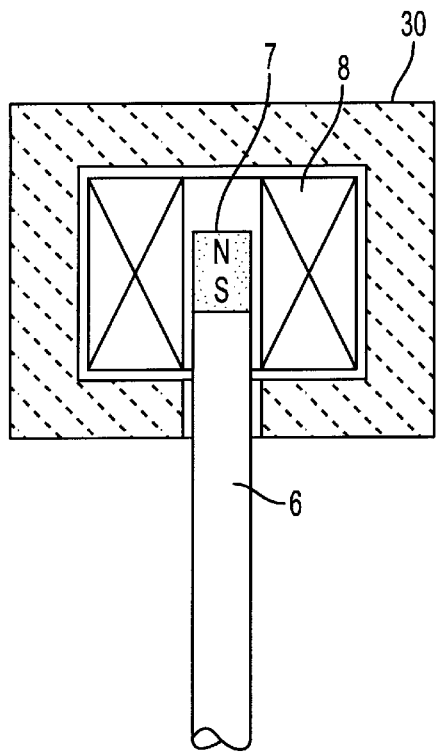
FIG. 10  FIG. 11
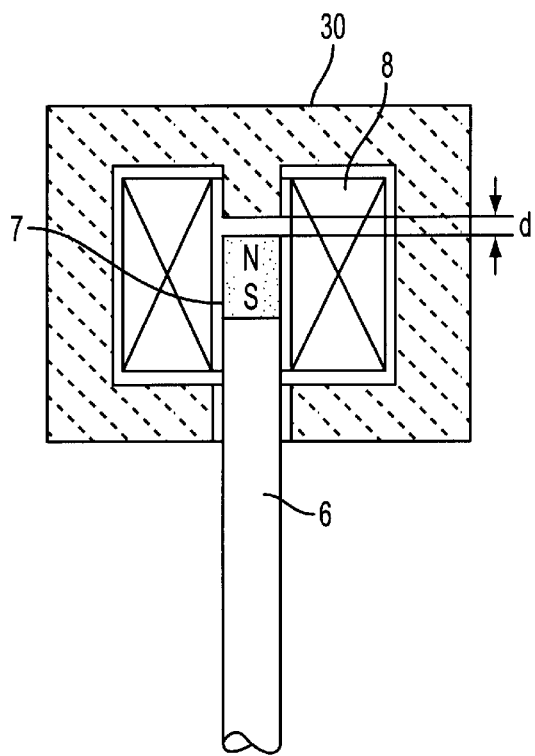
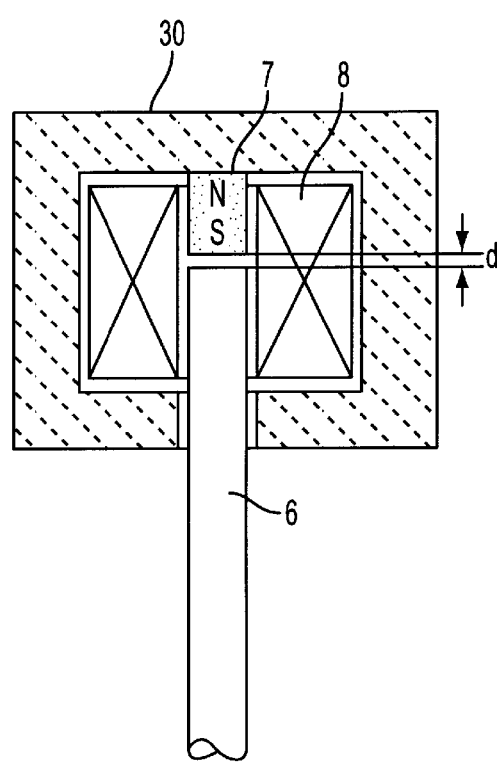
FIG. 12  FIG. 13

METHOD FOR DETERMINING THE POSITION AND/OR SPEED OF MOTION OF A CONTROL ELEMENT THAT CAN BE MOVED BACK AND FORTH BETWEEN TWO SWITCHING POSITIONS

BACKGROUND OF THE INVENTION

In control elements that can move back and forth between two switching positions, particularly fast-moving control elements, it is often necessary to determine the respective instantaneous speed and the respective instantaneous position of the switching element relative to the respective switching position in connection with a regulation and/or control during the movement of the control element. This is especially the case for determining the speed and position as the control element approaches the respective switching position.

Determining the speed and position is particularly significant in a control element that is connected to an armature that is moved back and forth, counter to the force of restoring springs, with the aid of an electromagnet or two spaced electromagnets. Because the force of the restoring springs that counteracts the movement increases linearly as the electromagnet approaches the respective switching position defined by the pole face of the electromagnet, the magnetic force increases progressively as the distance between the pole face and armature diminishes, and the armature moves with increasing speed toward the pole face with a constant current supply. As a result, the armature may not be held by the capturing electromagnet as it impacts the pole face, but may bounce backward. Depending on the magnitude of the impact speed, the armature can bounce completely away, so it is not held at all by the capturing electromagnet, or the armature bounces a short distance backward one or more times, but is always recaptured by the electromagnet. In both cases, however, it is no longer ensured that the system actuated by the control element will function properly. An example of a system embodied in this manner is a cylinder valve in a piston-type internal-combustion engine; the valve is connected to the armature, and can be opened and closed by way of two spaced electromagnets that are alternately supplied with current by a control device. A corresponding control of the current supply of the capturing electromagnet permits a reduction in the current at the capturing electromagnet as the armature approaches the pole face such that the respective effective magnetic force is slightly greater than the restoring force of the associated restoring spring, so the armature impacts the pole face "gently" with a speed of, for example, less than 0.1 m/sec.

To influence the control force acting on the control element such that the respective switching position is attained at a predeterminable speed, it is necessary to determine the speed curve using the control characteristic, on the one hand and, on the other hand, to determine the respective position of the control element, i.e., the control characteristic as a function of time, in order to influence the armature speed by changing the current supply. The use of two sensors, one of which determines the speed of the control element, while the other determines the course of the path as a function of time, offers an economical industrial application.

In the use of a path sensor, it is possible in principle to generate the speed signal from the path signal through differentiation. This is highly problematic, however, because the path signal includes noise components that cover the useful signal in the differentiation.

SUMMARY OF THE INVENTION

It is the object of the invention to provide a method that permits the determination of the speed and the path, as a function of time—referred to hereinafter as position —for a control element that can move back and forth, with only one sensor element.

In accordance with the invention, this object is accomplished by a method for determining the speed of movement and/or the position of a control element that can move back and forth between a first and a second switching position, in which an immersion or plunger body that is connected to the control element is guided synchronously with the movement of the control element by at least one stationary plunger coil, with the voltage that is generated due to a movement of the immersion body relative to a permanent magnet, and/or the movement of a permanent magnet relative to the plunger coil, being determined as a signal for the movement speed of the control element, and with changes in the impedance and/or a current that are caused by the movement of the immersion body in the plunger coil being determined as a signal for the position of the control element. This method capitalizes on the fact that, with a corresponding relative movement of the permanent magnet in the plunger coil, a voltage is induced that is a function of the rate of change of the magnetic flux, and thus of the movement speed. This voltage, or the course of the voltage, can be determined as a function of time, so a certain speed can be associated with each voltage value at a given time.

Because a separate immersion or plunger body is also moved synchronously with the movement of the control element in the plunger coil in addition to the permanent magnet, the effected changes in impedance, i.e., the changes in the impedance of the plunger coil, can be used to determine the respective position of the control element at any time. This is because the change depends on how far the immersion body dips into the plunger coil. The type of change depends on the electrical and/or magnetic properties of the immersion body. If the immersion body has a magnetic conductivity that is much greater than 1, the inductance changes, that is, a current flowing in the plunger coil changes its course as a function of time and the immersion depth. If the immersion or plunger body has a good electrical conductivity, the losses due to eddy-current effects in the plunger body change, which corresponds to an increase in the resistive component of the impedance. It is also possible, however, to determine the speed and position simultaneously using only one coil and the effect of the permanent magnet and the immersion body, without intermediate calculation steps.

Two possible procedures exist for determining the position. In a first embodiment of the invention, it is provided that the plunger coil is acted upon with a high-frequency alternating current, and the change in the current flow that is effected by eddy-current losses due to the movement of the immersion body in the plunger coil, the body at least partially comprising an electrically-conductive material, is determined as a signal for the position of the control element. The method capitalizes on the phenomenon of the generation of a magnetic alternating field when the coil is acted upon by an AC voltage, thereby effecting a current flow in the form of an eddy current in the electrically-conductive immersion body, which acts as a secondary winding. This current flow changes as a function of the immersion depth, that is, the position of the immersion body relative to the plunger coil. The properties of the coil, especially the AC behavior, also change, however, depending on the position of the immersion body. The position of the immersion body, and thus the position of the control element connected to the immersion body, can be ascertained through the determination of the impedance, or a value derived therefrom, such as the voltage, current or associated phase. The immersion body can be embodied as a separate element, or be formed by the control element itself. If the control element is produced from an electrically non-conductive material for some other reason, the immersion body comprising a conductive material is directly connected to the permanent magnet. In this instance, the electrically-conductive material of the immersion body should possess a relatively-low magnetic conductivity $\mu$ in order not to short-circuit the magnetic field of the permanent magnet. If the permanent magnet and the immersion body are disposed one behind the other in the direction of movement of the control element, the electrically-conductive material of the immersion body, as an "extension" of the magnet in one direction, can even have a positive effect with respect to the linearity of the temporal course of the voltage in the coil as a function of the speed of movement of the permanent magnet.

The frequency of the eddy-current measurement is advantageously suited for the frequency range required for the voltage measurement, in other words, the movement frequency of the control element. If, for example, a maximum signal frequency of about 100 kHz results for the voltage measurement for determining the movement speed, it is advantageous when a frequency that is higher by at least a factor of 10, for example a frequency of about 1 MHz, is preset for the position detection by way of the ascertainment of the eddy-current losses. This ensures that the measurements have virtually no effect on one another.

In a further, advantageous embodiment of the invention, it is provided that a material that only effects perceptible eddy currents at higher AC-current frequencies is used for the immersion body. With this method step, the influence of the eddy currents on the speed signal induced by the permanent magnet is kept as small as possible. It is therefore possible that the changes in the induced voltages in the frequency range to be measured remain extensively unaffected in order to obtain not only the speed signal, but also a signal over the path course of the control element, that is, to determine the respective position of the control element, and to attain an improved dynamic precision. This is possible, for example, through a so-called bundling of the immersion body, or with an immersion body comprising a sintered material of a corresponding composition or corresponding structure, so perceptible eddy-current losses that can be used for signal generation occur in the range of the carrier frequencies, but not in the range of the measurement frequencies, in immersion bodies of this embodiment.

In another embodiment of the method of the invention, it is provided that the changes in inductance that are caused by the movement of the immersion body comprising a magnetically-conductive material in the plunger coil are detected as a signal for the armature position. It is also the case here that the inductance of the coil supplied with current likewise changes as a function of the position of the immersion body relative to the coil due to the change in the magnetic field. A corresponding signal can, again, be derived from this change.

In a further advantageous embodiment of the invention, it is provided that two plunger coils having different numbers of windings are used in the region of movement of the immersion body connected to the permanent magnet. This procedure is particularly advantageous when the change in the inductance is to be used to determine the position of the immersion body. It is useful here to preset a number of windings for the portion of the coil associated with the immersion body for determining the position of the control element that differs from the number of windings of the portion of the coil associated with the permanent magnet connected to the immersion body for determining the speed of movement. The two coils can be disposed on the same coil body. It is also possible, however, to provide a coil that has a so-called tap, i.e., one portion of the coil has a small number of windings and the other portion of the coil has a large number of windings. To keep the necessary cable lines small, one of the two coils can be bridged by a capacitor for the high frequencies, so two connections suffice for the coil system.

Further advantageous embodiments are disclosed and discussed in the ensuing description of embodiments.

The invention is described in detail below in conjunction with schematic drawings of embodiments.

BRIEF DESCRIPTION OF THE DRAWINGS

FIGS. 6–10 show various embodiments for a sensor element for use in an actuator in accordance with FIG. 3.

FIGS. 11–13 show further embodiments for a sensor element.

DESCRIPTION OF THE PREFERRED EMBODIMENTS

Figure 1:
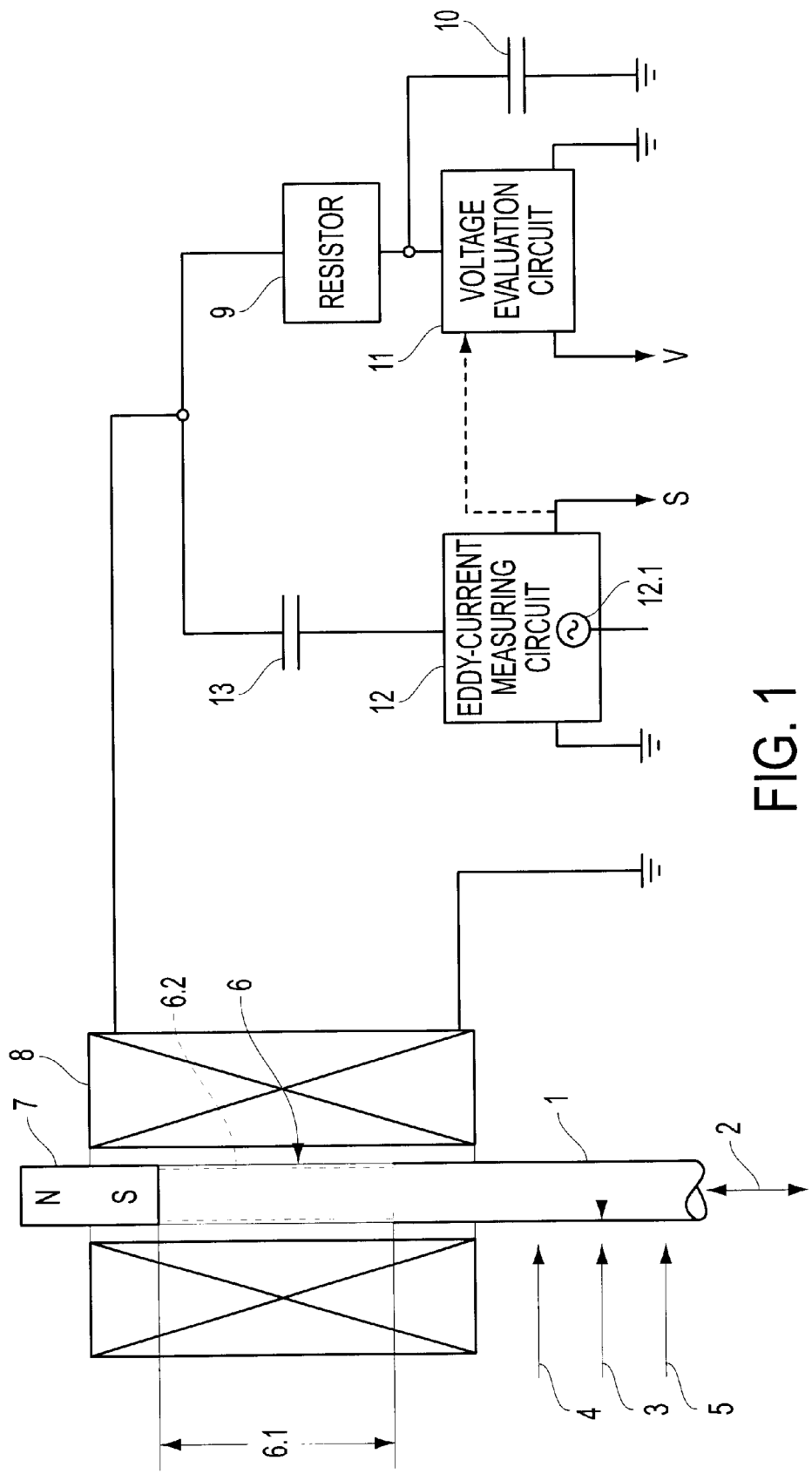
FIG. 1 is a basic diagram of a sensor element having a circuit, in the form of a block diagram.

FIG. 1 illustrates the fundamental design of a sensor element, in the form of a measuring circuit, for simultaneously determining the movement speed and position of a control element. A control element 1, which can be embodied as a pin, for example, is connected to a drive, not shown in detail, such as an electromagnetic actuator whose electromagnet is supplied with current and has an armature that is connected to the control element. The drive moves the control element 1 back and forth, corresponding to the arrow 2, starting from, for example, a central position defined by the mark 3 and into a first switching position 4 defined by a stop, not shown in detail, and a second switching position 5, which is likewise defined by a stop that is not shown in detail.

For operating the system connected to the control element 1, it is necessary to determine the movement speed and the path of the control element 1 as a function of time, that is, its respective positionIt is particularly important to determine the instantaneous speed and the instantaneous position in the approach region of the two switching positions 4 and 5. For this purpose, the control element 1 is connected to an immersion or plunger body 6, which is in turn connected to a permanent magnet 7, so that the immersion or plunger body 6 and the permanent magnet 7 are guided to move back and forth, synchronously with the movement of the control element 1, in a plunger coil 8. The precise length, immersion depth and location of the resting position are a function of the respective application, and are not limited to the illustrated example.

During the movement in the plunger coil 8, the permanent magnet 7 effects a change in the magnetic flux, which in turn induces a voltage in the plunger coil 8. To be able to detect the voltage, the plunger coil 8 is connected by way of a low-pass filter, for example, comprising a resistor 9 and a capacitor 10, to a voltage-evaluation circuit 11. This voltage-evaluation circuit 11 supplies the desired speed signal "v."

To be able to simultaneously determine the position of the immersion or plunger body 6 relative to the switching position 4 and/or 5, an eddy-current-measuring circuit 12, that is connected to a generator 12.1 for generating a high-frequency alternating current, is connected by way of a capacitor 13 to the plunger coil 8. The eddy-current-measuring circuit 12 applies a high-frequency current to the plunger coil 8. The capacitor 13 serves here as a frequency-dividing network. The eddy-current-measuring circuit 12 supplies the path or position signal "s." The supply of the path signal s detected in the eddy-current-measuring circuit 12 to the voltage-evaluation circuit 11 for determining the speed (as indicated by the dashed line connection) permits a corresponding correction of the speed-proportional voltage signal of the voltage-evaluation circuit 11.

In the illustrated embodiment, the immersion body 6 comprises an electrically-conductive material. The control element 1 can be produced in its entirety from an electrically-conductive material. The arrangement can also be such that the "immersion region" 6.1 of the plunger body 6 is provided with an electrically-conductive layer 6.2, which can also be embodied as an electrically-conductive sleeve, while the "core" of the plunger body 6 comprises a non-electrically-conductive material.

Figure 2:
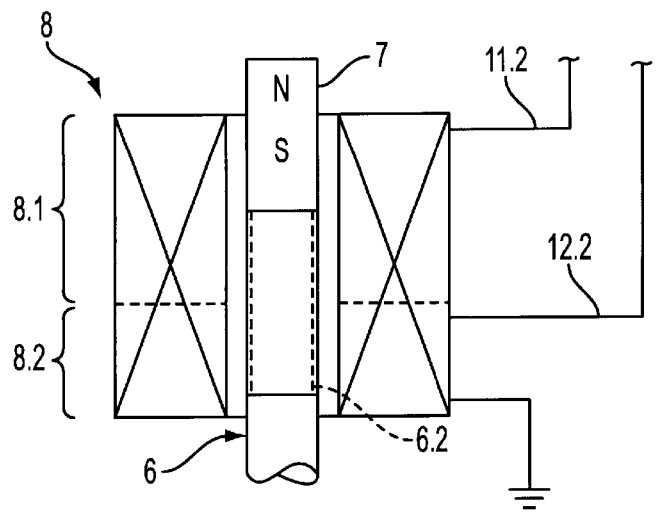
FIG. 2 is a modified embodiment of the sensor element according to FIG. 1.

In the modification illustrated in FIG. 2, the coil arrangement 8 provided for a control element 1 that comprises a magnetically-conductive material and is connected to the permanent magnet 7 includes either two coils that are disposed one behind the other and are wound onto the same coil body, and have different numbers of windings, or is formed by a coil having a tap, so the path or position measurement can be performed over the first coil region 8.1 with the smaller number of windings, and the speed measurement can be performed over the coil region 8.2 with the larger number of windings. The "immersion region" is also provided here with an electrically-conductive layer 6.2. The cables 11.2 and 12.2 leading away are then connected separately to the voltage-evaluation circuit 11, on the one hand, and to the eddy-current-measuring circuit 12, on the other hand. A coil arrangement of this type is suitable for arbitrary associations of the permanent magnet and the immersion body.

Figure 3:
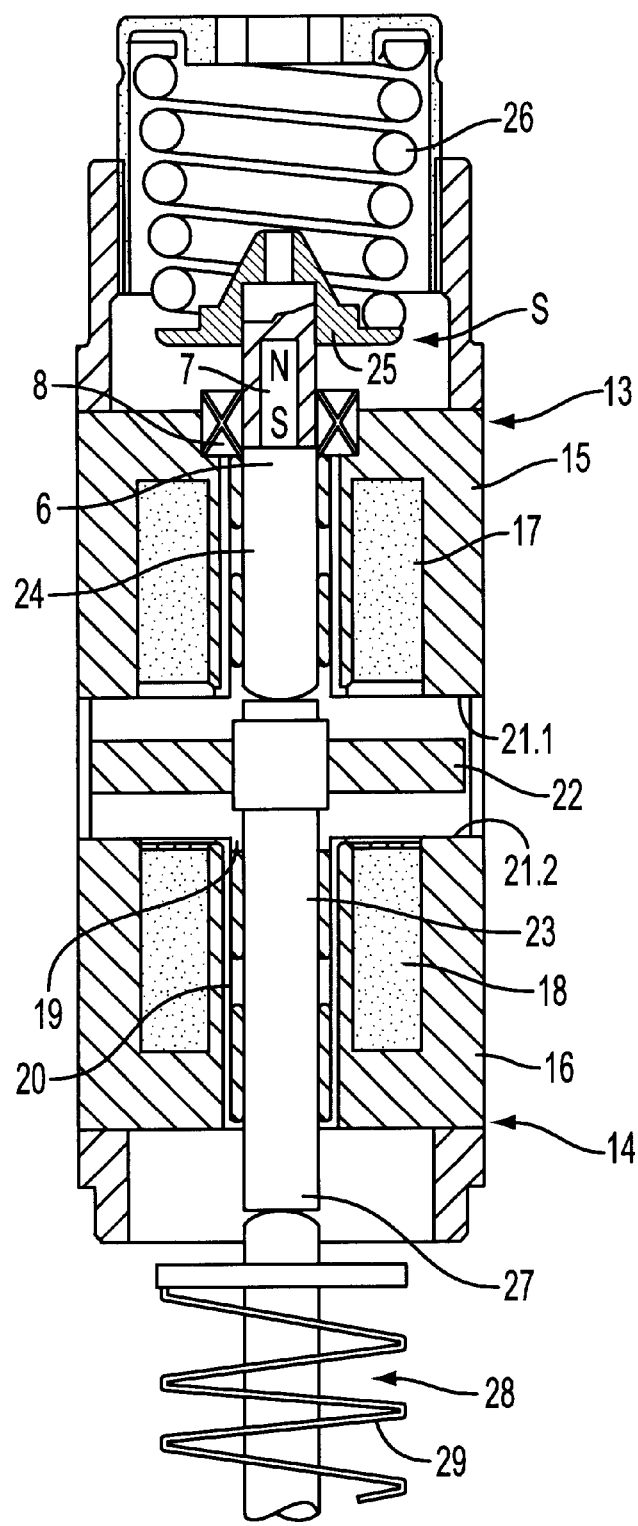
FIG. 3 shows an electromagnetic actuator for actuating a cylinder valve having an integrated sensor element.

FIG. 3 illustrates an electromagnetic actuator for actuating a cylinder valve as a practical application example. This electromagnetic actuator essentially comprises two electromagnets 13, 14, which each respectively have a laminated sheet metal yoke body 15, 16, in which a coil 17, 18, respectively, is disposed, with the coil being connected to a controllable current supply, not shown in detail. The yoke bodies 15, 16 each have a bore 19, in which a guide sleeve 20 is secured.

The two electromagnets 13, 14 are spaced from one another, so that their pole faces 21.1 and 21.2 face one another. Disposed in the space between the two pole faces 21.1 and 21.2 of the two electromagnets 13, 14 is a disk-shaped armature 22, which is fixedly connected to a guide pin 23. The guide pin 23 is guided in the guide sleeve 20 of the electromagnet 14. Provided in the electromagnet 13 is a separate guide pin 24, which is supported with one end on the armature-side guide pin 23, and with its other end on a restoring spring 26 by way of a spring plate 25.

The free end 27 of the guide pin 23 connected to the armature 22 is supported on a control member 28, such as the stem of a cylinder valve, with which a restoring spring 29 is associated. The two restoring springs 26 and 29 are embodied such that, when the electromagnets 13, 14 are not supplied with current, the armature 22 is located in the central position between the two pole faces 21.1 and 21.2.

The two electromagnets 13 and 14 are alternately supplied with current by way of a controlled current supply, so the armature 22 can alternately come into contact against the pole face 21.1 of the electromagnet 13 and the pole face 21.2 of the electromagnet 14, and when the coil 17 or 18 is acted upon by a so-called retaining current, the armature can be held on the associated pole face for a predetermined length of time.

If the current supply to the coil of the respective retaining electromagnet, for example the electromagnet 13, is cut off, the restoring force of the restoring spring 26 moves the armature 22 from the pole face 21.1 of the electromagnet 13 in the direction of the pole face 21.2 of the electromagnet 14. If the coil 18 of the capturing electromagnet 14 is supplied with current, for example shortly before the armature begins to move, the magnetic field exerted by the electromagnet 14 moves the armature 22 counter to the force of the restoring spring 29 to come into contact with the pole face 21.2 of the electromagnet 14, so the armature is, again, held against the pole face 21.2 by the charging of the coil 18 with a retaining current.

Because the magnetic force acting on the armature 22 increases progressively with an unregulated current supply as the armature 22 approaches the pole face of the electromagnet that is supplied with current, i.e., the capturing electromagnet, and the force of the associated restoring spring, which acts in the opposite direction, increases only linearly, the armature 22 moves toward the corresponding pole face 21 with increasing speed, and therefore impacts at a relatively-high speed. Through a corresponding stepping down of the current supply to the coil of the capturing electromagnet, the magnetic force acting on the armature 22 can be reduced as the armature approaches, so that the force only slightly exceeds the corresponding restoring force of the associated restoring spring, and the armature 22 impacts the pole face 21 at a reduced speed.

To reduce the step-down of the current as the armature continues to approach a pole face of a capturing electromagnet, in the embodiment illustrated here, at least the upper end of the guide pin 24 is embodied as an immersion body 6, which comprises an electrically-conductive material. The end of the immersion body 6 that faces away from the guide pin 24 is provided with a recess, into which a permanent magnet 7 is inserted.

In the yoke body 15, a sensor element S with a plunger coil 8 is inserted into a corresponding recess. The plunger coil is provided with a magnetic shield against the fields of the electromagnet 13, as will be described below in conjunction with FIGS. 6 through 13. The coil 8 is connected by way of corresponding circuits to an evaluation circuit and a control for the current supply.

This sensor element S comprising an immersion or plunger body 6, a permanent magnet 7 and a plunger coil 8 permits the determination of the respective position of the armature 22, and its respective speed, during operation by means of a corresponding evaluation circuit, and the connection of the position or path signals, on the one hand, and the speed signals that are obtained from this, on the other hand, to the aforementioned control of the current supply in order to reduce the current supply as the armature 22 approaches a pole face 21.1 or 21.2 of the respective capturing electromagnet until the armature impacts the pole face at only a low speed, and can be captured and held without bouncing.

Figure 4:
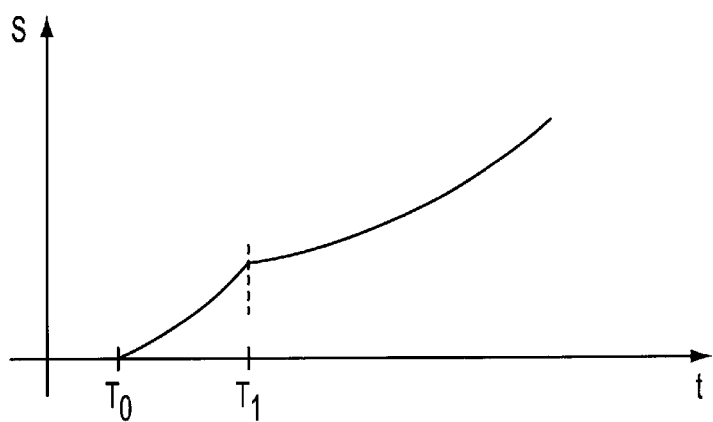
FIG. 4 shows the path curve when an armature of an electromagnetic actuator is released, as a function of time.
Figure 5:
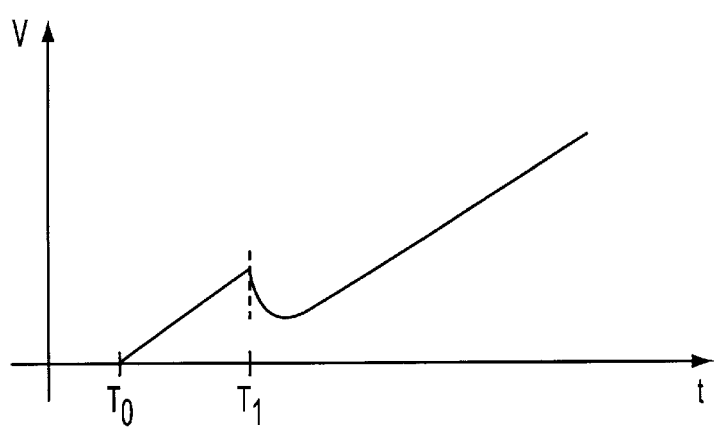
FIG. 5 shows the speed curve when an armature of an electromagnetic actuator is released, as a function of time.

FIGS. 4 and 5 show the detection of the movement course when the armature 22 detaches or is released from the pole face, which is significant for the illustrated example of an electromagnetic actuator for actuating a cylinder valve.

If a so-called valve play exists between, for example, the guide pin 27 and the cylinder valve that forms the control member 28, that is, a space exists between the free end of the guide pin 27 and the free end of the stem of the cylinder valve 28 when the armature 22 rests against the pole face 21.1 of the electromagnet 13 (closing magnet), the valve play can also be detected with the measuring method according to the invention.

FIG. 4 illustrates the course of the path of the armature 22 as a function of time, specifically from the time $T_0$, when the armature detaches or releases from the pole face 21.1. Because of the space present between the free end of the guide pin 27 and the cylinder valve 28, the armature 22 moves, along with the immersion body 6, toward the stem of the cylinder valve with increasing speed, due to the lower mass and the absence of the countereffect of the restoring spring 29, until the impact time $T_1$. Now the restoring spring 26, in connection with the magnetic field building up at the electromagnet 14 (opening magnet), further accelerates the armature 22 counter to the force of the restoring spring 29. A larger mass must suddenly be accelerated, which manifests itself as an unsteadiness in the course of the measurement curve detected by the eddy-current-measuring circuit 12 for the path as a function of time. A signal for the magnitude of the existing valve play can also be derived when the location of unsteadiness is ascertained.

In the same way, when valve play exists, the above-described execution of movement in the cylinder valve becomes apparent in the determination of the speed. As can be seen in FIG. 5, the armature accelerates after detaching. When the guide pin 27 impacts the stem 28 of the closed cylinder valve, however, the armature is braked sharply, so the movement speed drops, and does not increase again until the armature and the cylinder valve accelerate. The speed measurement reveals a pronounced unsteadiness in the detected voltage curve, so the voltage curve representing the speed curve allows for conclusions about the magnitude of the existing valve play.

Knowledge of the physical connection between the measured path and the speed renders the above-described method for simultaneously determining the path and speed capable of self-calibration. If, as in many cases, the noise components of the respective generated signals makes them unsuitable for obtaining speed information from the path information, or for generating a path signal from the speed information through integration, a calibration of the respective other signal can be achieved by virtue of the physical connection. Thus, a path difference over a lengthy movement distance, with regard to the required time, can be used in the calibration through a comparison with the average speed calculated in the speed measurement.

Various embodiments for a sensor element S are described in conjunction with FIGS. 6 through 13. FIG. 6 shows the fundamental design. The coil 8 or two coils 8.1 and 8.2, as shown in FIG. 2, is or are surrounded on all sides by a low-eddy-current housing 30 having throughgoing openings 31 and 32 for the immersion body 6 connected to the control element 1. The housing can comprise a sheet metal winding, or be produced from a metal-ceramic sintered body with a corresponding composition of the sintered powder, such as ferrite powder. It possesses magnetically-conductive properties, however. The housing 30 is embodied, for example, to be rotationally symmetrical relative to the axis of movement of the immersion body 6.

This housing 30 shields the coil 8 against magnetic fields, so the arrangement illustrated in, for example, FIG. 3 is possible in or on an actuator magnet without its magnetic field acting as an interfering field on the sensor S.

The immersion body 6 is likewise produced, as an extension of the permanent magnet 7, from a magnetically-conductive material, but is provided with an electrically-conductive layer or envelope 6.2, which can extend beyond the permanent magnet 7, as shown in FIG. 3.

In FIG. 7, the modification of the embodiment shown in FIG. 6 includes the arrangement of a conducting element or tube 33 disposed on the housing 30, which covers the region of movement of the permanent magnet 7 in tubular fashion, and can influence the sensitivity characteristic. The length and/or diameter of the tube 33 is or are to be adapted to the respective application. Instead of a conducting element or tube 33 on the housing 30, the end of the immersion or plunger body 6 can also have a corresponding shape, as shown in FIGS. 9 and 10.

In the embodiment illustrated in FIG. 8, the housing 30 is embodied in two parts. A permanent-magnet ring 7.1 having an axial polarity—as indicated—is disposed between the two parts 30.1 and 30.2. Whereas, in the embodiment according to FIG. 6, the permanent magnet 7 moves with the immersion body 6 relative to the coil 8, in the embodiment according to FIG. 8, the movements of the immersion body 6 relative to the stationary coil 8 and the stationary permanent-magnet ring 7.1 generate the measurement signals.

FIGS. 9 and 10 illustrate corresponding modifications. FIGS. 9 and 10 depict embodiments with a correspondingly-shaped end 6.4 for the immersion body 6 for influencing the sensitivity characteristic. In the embodiment according to FIG. 10, the pin 6.1 is produced from a magnetically non-conductive material, such as high-quality steel, and is tapered at the free end 6. An end piece 6.5 comprising a magnetically-conductive material, such as iron, is mounted to this end.

FIGS. 11, 12 and 13 illustrate embodiments that include a housing 30 that is closed at the ends. In this case, the change in the distance "d" between the free end of the permanent magnet 7 and the housing wall is decisive for the induced voltage. At a constant speed, the voltage increases approximately quadratically with respect to the decrease in distance. This increases the resolution and precision of the generated signal in the end phase of the approach to the housing wall that simultaneously defines the switching position; the free end of the immersion body 6 does not impact the housing wall here. In switching magnets, the armature's approach toward the pole face should be controlled with the current supply such that the armature moves at a low speed.

As shown in FIGS. 12 and 13, the permanent magnet 7 can be secured to either the immersion or plunger body 6 or the housing 30 for this embodiment.

Figure 14:
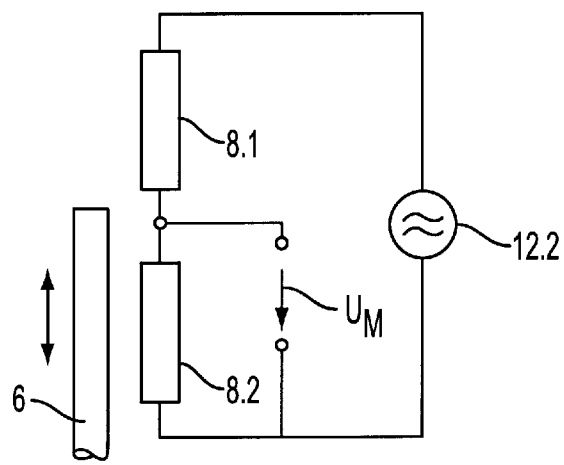
FIG. 14 is a circuit diagram for an embodiment with two measuring coils in the sensor element to measure position.

The evaluation of the position is not limited to the normal eddy-current principle. Rather, other, known methods can also be used here. In the use of two coils 8.1 and 8.2, for example, an inductive voltage divider can be constructed from the two coils 8.1 and 8.2 with the inductances $L_1$ and $L_2$, as depicted in FIG. 14. The immersion body 6, as the core of the two coils, is moved back and forth inside the coils, thereby changing the inductance of the coils. If the series connection of these coils is now acted upon by a (high-frequency) AC voltage by way of an AC generator 12.2, in accordance with the voltage-divider rule, a measurement voltage $U_M$ results, which follows the equation $U_M = U_G \cdot L_1/(L_1+L_2)$, with $U_G$ as the voltage of the generator 12.2. The more of the immersion or plunger body 6 that extends into the lower coil 8.2, the greater the inductance of this coil and, accordingly, the larger the measurement voltage. Because this depends on the real part of the magnetic permeability $\mu$, eddy currents should be avoided in this method, for example through the use of a low-eddy-current immersion body 6 having a large $\mu$.

A further option of evaluating such reductions in inductance lies in wiring the inductances as components of a bridge.

Figure 15:
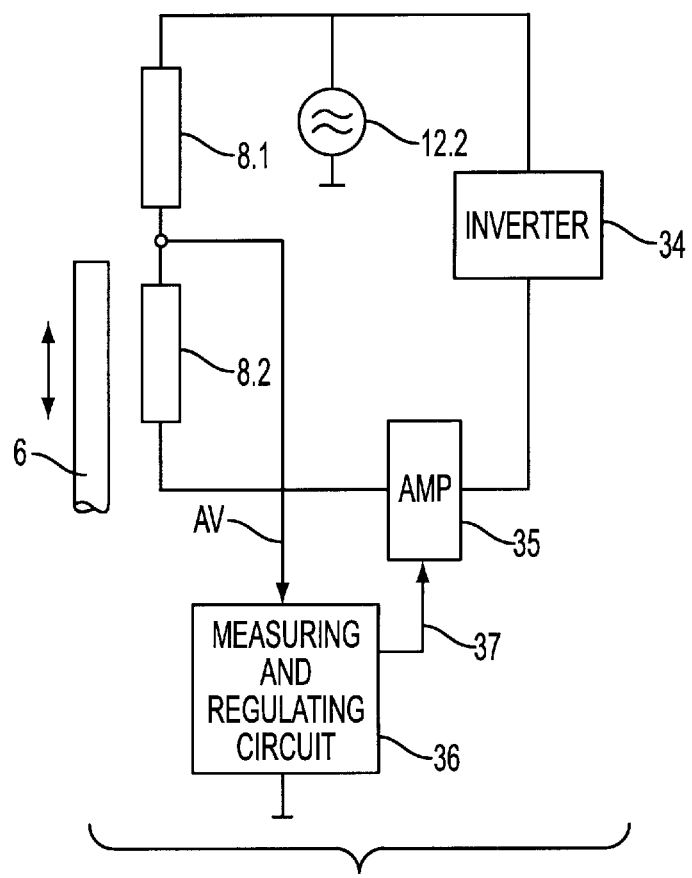
FIG. 15 is a further circuit diagram for an embodiment with two measuring coils in the sensor element to measure position.

FIG. 15 shows a third variation. Here, the voltage of an AC-voltage generator 12.2 is applied directly to a coil 8.1. Furthermore, the voltage is inverted by a circuit 34, and therefore applied, phase-shifted by 180°, to the second coil 8.2. Initially, the amplifier circuit 35 is disregarded. If the two coils have the same impedance, an output voltage AV of 0 Volts is established in the center of the two coils (due to the antiphase supply of the coils). If the inductances vary in magnitude, however, a voltage AV, which differs from zero, is established as the measurement signal. This is recognized by a measuring and regulating device 36, whereupon a "control signal" 37 is generated, which adjusts the amplifier circuit until the signal AV becomes zero again. The phase of the output signal AV indicates the direction in which the amplification must be adjusted, that is, whether the coil 8.2 must be supplied with a larger or smaller signal. A signal of the AC-voltage generator 12.2, which is not shown for the sake of a clear overview, is made available to the measuring and regulating device 36, and is factored into the measurement, for example through the synchronous rectification of the measurement signal AV.

The control signal 37, whose magnitude is a function of the impedance ratios of the coils, which are in turn influenced by the moving immersion body 6, can be used as the position signal.

Figure 16:
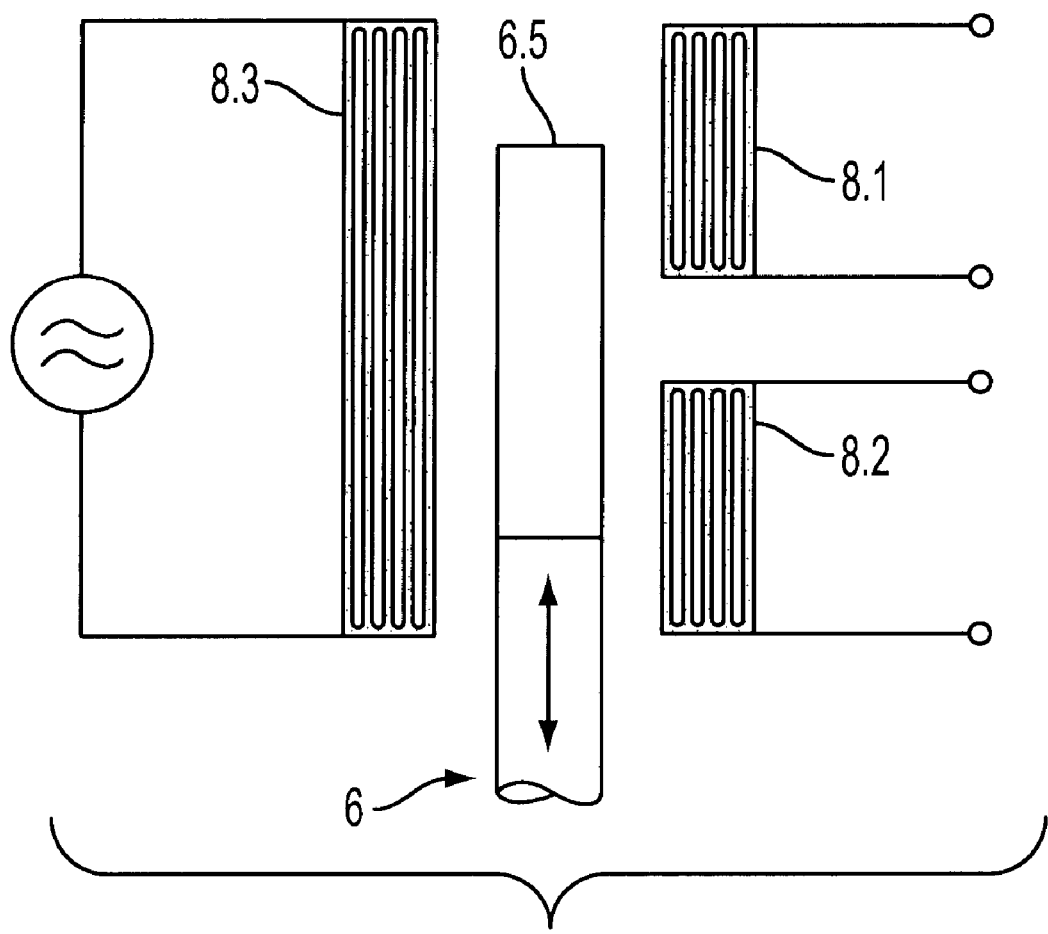
FIG. 16 is another circuit diagram for an embodiment with three measuring coils in the sensor element for measuring position.

FIG. 16 depicts a further alternative for measuring the position, which involves three coils. This option employs the known LVDT (Linear Variable Displacement Transducer) method. Here, a primary coil 8.3 is acted upon by a high-frequency alternating current. The upper portion 6.5 of the immersion body 6 has a high magnetic conductivity. Consequently, a voltage or current is over-coupled, particularly in the secondary coil 8.1 or 8.2 in which the upper portion 6.5 of the immersion body 6 is located.

An evaluation of the two secondary voltages of the two secondary coils 8.1 and 8.2 can indicate the position of the upper portion 6.5.

Different evaluation circuits are conceivable. For example, the center taps of the coils can be connected, and the outer connections can be guided together, by-way of resistors, to a synchronous rectifier that is synchronized with the high-frequency source connected to the primary coil. Low-pass filtering yields a signal that is proportional to the position. A more detailed description and the representation of further evaluation options for the signals are omitted here, as they are known from the state of the technology.

What is claimed is:

1. A method for simultaneously determining the position and/or the speed of movement of a control element that can move back and forth between a first and a second switching position, in which a plunger body that is connected to the control element is guided synchronously with the movement of the control element by at least one stationary plunger coil, said method comprising: providing a plunger body formed at least in part of a magnetically conductive material; supplying the plunger coil with an alternating current or an alternating voltage; providing a permanent magnet adjacent the plunger coil for movement relative to one of the plunger body and the plunger coil; determining a change in the voltage that is generated in the plunger coil due to a movement of the plunger body relative to the permanent magnet, or the movement of the permanent magnet relative to the plunger coil, as a signal for the movement speed of the control element; and determining changes in one of the impedance and a current in the plunger coil caused by the movement of the plunger body in the plunger coil as a signal for the position of the control element.

2. The method according to claim 1, further including: supplying the plunger coil with a high-frequency alternating current, forming the plunger body at least partially of an electrically-conducting material; and determining the changes in the current flow in the plunger body that are effected by eddy-current losses due to the movement of the plunger body in the plunger coil as the signal for the position of the control element.

3. The method according to claim 2, further including using a material that only permits eddy currents at higher AC frequencies for the plunger body.

4. The method according to claim 1, further including: forming at least the portion of the plunger body that extends into the plunger coil of a magnetically conductive material; and determining the changes in the inductance of the plunger coil due to the movement of the immersion body in the plunger coil as the signal for the position of the control element.

5. The method according to claim 1, further including using two of the plunger coils having different numbers of windings in the movement region of the plunger body.

6. The method according to one of claim 1, wherein the control element is connected to an armature, which can be moved out of a first switching position, counter to the force of at least one restoring spring, when an associated electromagnet provided with a pole face is supplied with current, and comes into contact with the pole face in its second switching position.

7. The method according to claim 6, wherein the plunger coil is disposed in the region of the electromagnet, and further comprising shielding the plunger coil against the magnetic field of the electromagnet.

8. A method for simultaneously determining the position and/or the speed of movement of a control element according to claim 1, wherein the step of providing a permanent magnet includes mounting the permanent magnet on the control element for movement through the plunger coil.

9. A method for simultaneously determining the position and/or the speed of movement of a control element according to claim 1, wherein the step of providing a permanent magnet includes mounting the permanent magnet in a yoke of the plunger coil at a position adjacent the path of movement of the plunger body.

10. A method for simultaneously determining the position and the speed of movement of a control element that can move back and forth between a first and a second switching position, in which a plunger body, which is formed at least in part of magnetically conductive material, is connected to the control element, and is guided synchronously with the movement of the control element through at least one stationary plunger coil, with the method comprising: supplying the plunger coil with an alternating current or an alternating voltage; permeating the at least one plunger coil with a continuous magnetic field; determining a change of voltage generated in the plunger coil, due to movement of the plunger body relative to the plunger coil, as a signal for the movement speed of the control element; and determining changes in one of the impedance and a current in the plunger coil caused by the movement of the plunger body in the plunger coil as a signal for the position of the control element.

11. A method for simultaneously determining the position and the speed of movement of a control element according to claim 10, wherein the step of permeating includes mounting a permanent magnet on the control element for movement through the plunger coil.

12. A method for simultaneously determining the position and the speed of movement of a control element according to claim 10, wherein the step of permeating includes mounting a permanent magnet in a yoke of the plunger coil at a position adjacent the path of movement of the plunger body.

13. A method for simultaneously determining the position and the speed of movement of a control element that can move back and forth between a first and a second switching position, in which a plunger body, which is formed of magnetically conductive or electrically conductive material, is connected to the control element, and is guided synchronously with the movement of the control element through at least one stationary plunger coil, with the method comprising: supplying the plunger coil with an alternating current or an alternating voltage; determining a change in voltage generated in the plunger coil due to one of movement of the plunger body relative to a fixed permanent magnet disposed adjacent the plunger coil, and movement of a permanent magnet connected to the plunger body relative to the plunger coil, as a signal for the movement speed of the control element; and determining changes in one of the impedance and the current in the plunger coil caused by the movement of the plunger body in the plunger coil as a signal for the position of the control element.

* * * * *